United States Patent
Newstadt et al.

(10) Patent No.: US 8,407,766 B1
(45) Date of Patent: Mar. 26, 2013

(54) METHOD AND APPARATUS FOR MONITORING SENSITIVE DATA ON A COMPUTER NETWORK

(75) Inventors: Keith Newstadt, Newton, MA (US); Adam P. Schepis, Milford, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1069 days.

(21) Appl. No.: 12/054,103

(22) Filed: Mar. 24, 2008

(51) Int. Cl.
*H04L 29/06* (2006.01)
(52) U.S. Cl. ............. 726/4; 726/5; 726/6; 726/7; 726/8; 726/9; 726/10
(58) Field of Classification Search .................. 726/4–10
See application file for complete search history.

(56) References Cited

U.S. PATENT DOCUMENTS

| | | | |
|---|---|---|---|
| 7,516,418 B2 * | 4/2009 | Herley et al. ................. 715/816 |
| 7,617,532 B1 * | 11/2009 | Alexander et al. ............. 726/22 |
| 2003/0009495 A1 * | 1/2003 | Adjaoute .................... 707/501.1 |
| 2003/0101212 A1 * | 5/2003 | Borg ............................. 709/203 |
| 2006/0100990 A1 * | 5/2006 | Aaron ............................... 707/3 |

OTHER PUBLICATIONS

Lee, Soekhee, Password Recovery Using an Evidence Collection Tool and Countermeasures. 2007. pp. 1-6.*

* cited by examiner

*Primary Examiner* — Michael Pyzocha
*Assistant Examiner* — Randal Moran
(74) *Attorney, Agent, or Firm* — Wilmer Cutler Pickering Hale and Dorr LLP

(57) ABSTRACT

A method and apparatus for monitoring sensitive data on a computer network is described. In one embodiment, a method for protecting sensitive data from being leaked to a computer network comprises monitoring data related to a user that is presented on one or more web pages through a common interface, which enables a search for sensitive data on the one or more web pages of the one or more web sites and determining a disclosure of the sensitive data on a web page of one or more web pages.

18 Claims, 4 Drawing Sheets

METHOD AND APPARATUS FOR MONITORING SENSITIVE DATA ON A COMPUTER NETWORK

BACKGROUND OF THE INVENTION

1. Field of the Invention

Embodiments of the present invention generally relate to a computer network monitoring systems and, more particularly, to a method and apparatus for monitoring sensitive data on a computer network.

2. Description of the Related Art

Because of the rapid development and progression of data networks, people spend a significant amount of time browsing web sites on the Internet and connecting to various computer networks and database systems. In particular, children spend a considerable amount of time viewing and/or posting material on social networking web sites (e.g., FACEBOOK, MYSPACE, WEBKINZ and the like), blogs, chat forums and other publicly accessible web sites. The material may be in the form of a profile (e.g., MYSPACE profile), comments (e.g., public comments on other MYSPACE user profiles, comments in a discussion thread, bulletin board or blog), chat room discussions, incoming/outgoing messages/email and other postings (e.g., blog or bulletin board posts).

While browsing, children (especially teenagers) may accidently or knowingly post sensitive data (e.g., credit card numbers, phone numbers, addresses, and one or more pieces of personal information deemed sensitive by the parents) on one or more publicly accessible websites. As a result, the sensitive data is accessible by anyone who can connect to Internet. The malicious use of sensitive data disclosed on the internet is subject matter of significant concern in today's society. In particular, the parents of the children desire more control over what material is being posted on publicly accessible websites to protect or limit sensitive data from being disclosed on the internet. Parents are concerned because children are likely to make poor decisions regarding whether to post material that includes sensitive data.

According to one prevalent method available to parents, sensitive data is identified using the child's real name and/or email address. But the child may use a secret email address or a fake real name on one or more web sites. Moreover, the current solution is only able to search a selected number of web sites (e.g., MYSPACE but not FACEBOOK). Furthermore, such a solution only alerts the parents as to a disclosure of sensitive data and is incapable of removing the sensitive data automatically or upon request by the parents.

According to another prevalent method, a software program installed on a particular computer is configured to prevent sensitive data from leaving the particular computer, but the software program cannot prevent the leakage of sensitive data from other computers. A child may access the Internet from one or more computers outside the control of the parents (e.g. a school computer, a friend's computer, a library computer, a internet café and the like).

Therefore, there is a need in the art for a method and apparatus for monitoring sensitive data on a computer network to protect the sensitive data from disclosure.

SUMMARY OF THE INVENTION

Embodiments of the present disclosure generally comprise a method and apparatus for monitoring sensitive data on a computer network. In one embodiment, a method for protecting sensitive data from being leaked to a computer network comprising monitoring data related to a user that is presented on one or more web pages through a common interface, wherein the common interface enables a search for sensitive data on one or more web pages of one or more web sites and determining a disclosure of the sensitive data on a web page of one or more web pages.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
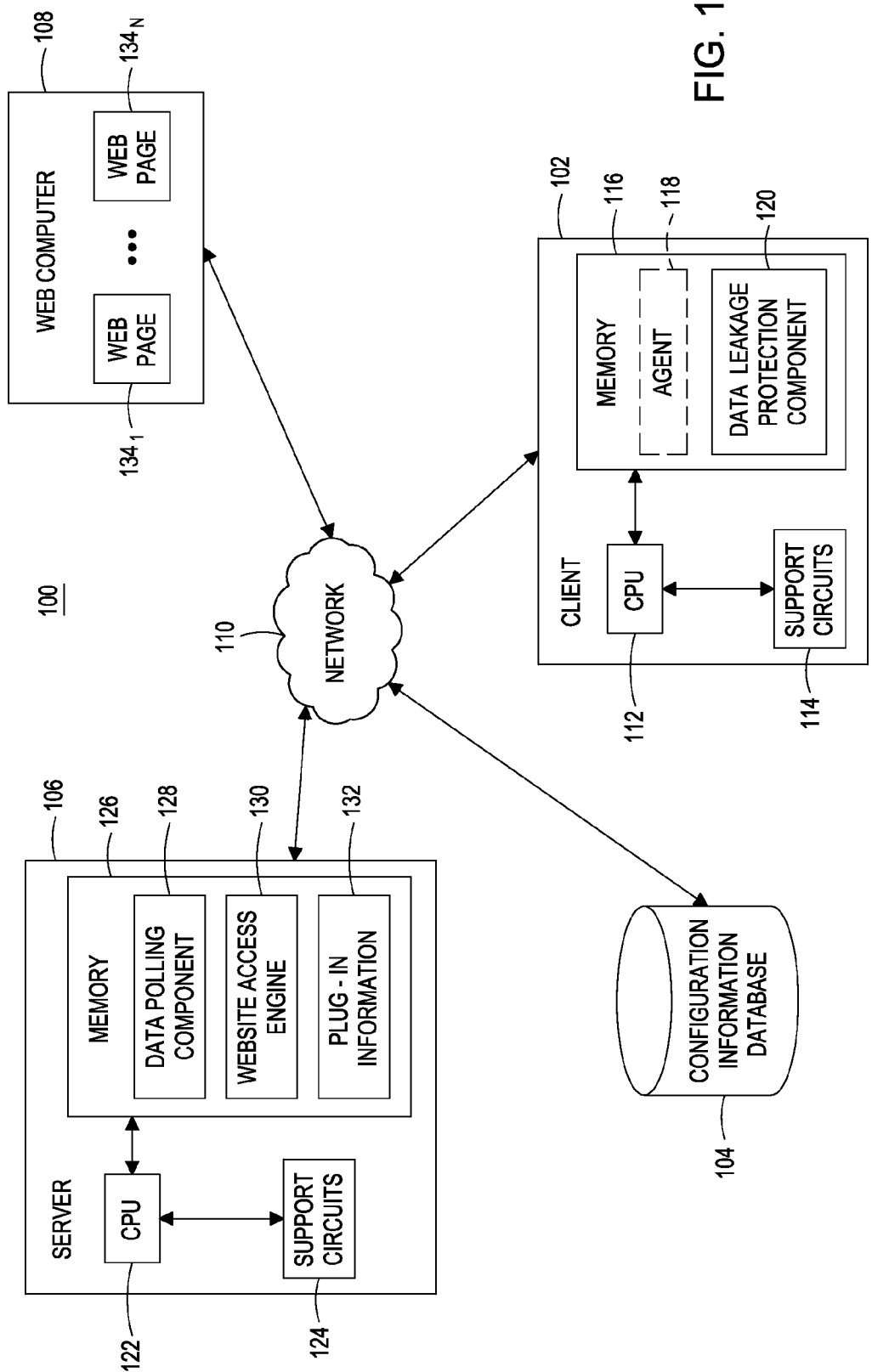
FIG. 1 depicts a block diagram of a system for protecting sensitive data according to one or more embodiments of the present invention.

FIG. 1 depicts a block diagram of a system 100 for protecting sensitive data, according to one or more embodiments of the present invention. The system 100 comprises a client 102, a configuration information database 104, a server 106, and a web computer 108, which are coupled to each other through a network 110. It is appreciated that the system 100 is not limited to embodiments that comprise one web computer 108 and may comprise a plurality of web computers.

The client 102 is a computing device (e.g., laptop, desktop, mobile device, Personal Desk Assistant (PDA)), such as those generally known in the art. The client 102 comprises a Central Processing Unit (CPU) 112, various support circuits 114 and a memory 116. The CPU 112 may comprise one or more commercially available microprocessors or microcontrollers that facilitate data processing and storage. Various support circuits 114 facilitate operation of the CPU 112 and may include clock circuits, power supplies, input/output circuits and/or the like. The memory 116 includes a read only memory, random access memory, disk drive storage, optical storage, removable storage, and the like. In one embodiment, the client 102 is a computer used by a child through which a responsible party (e.g., a parent) wants to protect sensitive data from disclosure. The memory 116 includes various software packages, such as a data leakage protection component 120.

The data leakage protection component 120 processes sensitive data (e.g., from the parents) and login information associated with one or more web sites to produce configuration information, which is stored in the configuration information database 104. In one embodiment, the parents input Uniform Resource Locators (URLs) of the one or more web sites (e.g., web sites that are routinely accessed by a child on the client 102) as well as the login information (e.g., login name, password, email address, answers to challenge questions, profile name and any other information needed for a login sequence) required to access the material posted on the one or more web sites and to remove any the material that includes the sensitive data.

Optionally, the memory 116 includes an agent 116 that is configured to collect the configuration information from various resources in the client 104. In one embodiment, the agent 116 enables the generation of configuration information without requiring any input from the parents. For example, the parents may not know the certain portions of the login information (e.g., the email address or profile name used for a MYSPACE profile) because the child desires to use the particular web site without parental knowledge. Instead, the agent 116 determines such portions of the login information by examining a browser history used at a particular site. For example, the browser history indicates the email address used to login into the MYSPACE profile.

The configuration information database 104 stores the configuration information provided by the agent 116 and/or the data leakage component 120 (e.g., input from the parents). In one embodiment, the client 104 communicates the configuration information to a location within the configuration information database 104. The configuration information database 104 provides the configuration information to the server 106 to protect the sensitive data related to a particular user from disclosure on one or more web sites hosted by the web computer 108, as explained further below.

The server 106 comprises a Central Processing Unit (CPU) 122, various support circuits 124 and a memory 126. The CPU 112 may comprise one or more commercially available microprocessors or microcontrollers that facilitate data processing and storage. Various support circuits 114 facilitate operation of the CPU 112 and may include clock circuits, power supplies, input/output circuits and/or the like. The memory 116 includes a read only memory, random access memory, disk drive storage, optical storage, removable storage, and the like. The memory 126 includes various software packages, such as a data polling component 128 and a website access engine 130. The memory 126 further includes various data, such as plug-in information 132.

The web computer 108 is a computing device (e.g., a web server for hosting one or more web sites) configured to host one or more web sites. The web computer 108 comprises a web page 134$_1$, a web page 134$_2$ . . . a web page 134$_n$, hereinafter generally referred to as the web pages 134. The web computer 108 is configured to control access to the web pages 134 by the client 102 (e.g., through login names and passwords). Once access is authorized, the web pages 134 are transmitted and presented on the client 102.

The network 110 comprises a communication system that connects computers by wire, cable, fiber optic, and/or wireless links facilitated by various types of well-known network elements, such as hubs, switches, routers, and the like. The network 110 may employ various well-known protocols to communicate information amongst the network resources. For example, the network 110 may be part of the Internet or intranet using various communications infrastructure such as Ethernet, WiFi, WiMax, General Packet Service (GPRS), and the like.

The data polling component 128 cooperates with the web access engine 130 to access and/or monitor one or more web sites hosted by the web computer 108 using the configuration information (e.g., login information associated with a particular user of the one or more web sites) stored in the configuration information database 104. In one embodiment, the data polling component 128 accesses the configuration information database 104 to extract URLs of the one or more web sites, the sensitive data associated with the particular user and/or login information associated with the one or more web sites. Based on the configuration information, the data polling component 128 uses the web access engine 130 to perform a search of the web pages 134 within the web computer 108, as explained further below.

The web access engine 130 is configured to provide a common interface between the data polling component 128 and the one or more web sites hosted on the web computer 108 (i.e., a plurality of web servers). The data polling component 128 interacts with various implementations of the one or more web sites through the common interface. The common interface enables access to the web pages 134 for the data polling component 128 even though the one or more web sites may employ distinct layouts, schemas, web Application Programming Interfaces and/or file systems. In one embodiment, the data polling component 128 uses the common interface generated by the web access engine 130 to examine (e.g., search, parse, analyze) the web pages 134 for a disclosure of the sensitive data indicated in the configuration information.

In one embodiment, the common interface is effectuated through a supporting plug-in architecture where plug-ins. Each plug-in comprises web site specific information that is required to search the web pages 134 for any sensitive data by parsing the web pages 134 and/or accessing the web API. The web access engine 130 implements the common interface using one or more plug-ins that are specific to one or more web sites and stored in plug-in information 132. As such, the plug-in information 132 enables identification of any sensitive data on the web pages 134 by the data polling component 128. Plug-ins may be added to the plug-in architecture in the future to support additional web sites.

According to one embodiment, the data polling component 128 submits the login information (e.g., email address, social networking profile name, username, password and the like) associated with the particular user through the web access engine 130 to acquire access to material posted on the web pages 134 by the particular user according to one embodiment. The web computer 108 verifies the login information associated with the particular user and authorizes access to the material posted on the web pages 134. Once access is granted, the data polling component 128 monitors (e.g., examines on a periodic basis) material presented on the web pages 134 for the sensitive data related to the particular user. In one embodiment, the web access engine 130 generates an access request comprising the login information to be processed by a web Application Programming Interface (API) associated with the web computer 108.

For example, the data polling component 128 and the web access engine 130 submit an email address and a password for a FACEBOOK profile to a FACEBOOK web server that implements the FACEBOOK Platform API. In response, the FACEBOOK web server authorizes access to one or more portions of the web pages 134. Notably, the FACEBOOK web server permits access to various portions of the web pages 134 for FACEBOOK members and restricts access for non-FACEBOOK members. In addition, the FACEBOOK web server may restrict or prevent a first FACEBOOK member from viewing or accessing information within a FACEBOOK member profile of a second FACEBOOK member based on various factors (e.g., the information is set as private, the second FACEBOOK member is not a Friend of the first FACEBOOK member, the second FACEBOOK member is under eighteen years old and the like). Accordingly, the email address and password enable the data polling component 128 and the web access engine 130 to access, search and/or remove material (e.g., information within profiles) on the FACEBOOK web server that would otherwise be unavailable.

In one embodiment, the data polling component 128 removes the sensitive data posted on the one or more web sites using the login information (e.g., profile name and password). For example, if the data polling component 128 identifies the sensitive data (e.g., a phone number, an address and/or a social security number) posted on a social networking profile (e.g., MYSPACE profile) associated with the particular user or as a comment posted by the particular user on another social networking profile (e.g., a friend's MYSPACE profile), then the data polling component 128 uses the email address and password to log into a social networking account owned by the particular user and to remove the sensitive data. In another embodiment, the data polling component 128 is configured to notify the parents of the particular user if any sensitive data has been disclosed through the one or more web sites. As another example, if the data polling component 128 determines that the sensitive data is posted on a web blog, then the data polling component 128 sends a notification regarding the disclosure to the parents.

In operation, the data polling component 128 generates a search query in a generic query language that includes the sensitive data. The web access engine 130 is configured to processes the search query defined in the generic query language to produce a second search query that is acceptable (e.g., executable) by a web site hosted by the web computer 108 according to various embodiments of the present invention. The web access engine 130 communicates the second search query to the web computer 108 for processing. As such, the web access engine 130 functions as the common interface between the data polling component 128 and the web site hosted by the web computer 108.

In one embodiment, the web access engine 130 translates or maps the search query to the second search query in accordance with a query language defined by the web computer 108 for the web site (e.g., Google Search Syntax) and described in a portion of the plug-in information 132 (e.g., a plug-in associated with the web site). The second search query may comprise a search string that includes the sensitive data and/or the login information. In one embodiment, the second search query is submitted to the web Application Programming Interface (API) associated with the web site (e.g., Asynchronous JavaScript and XML (AJAX) Web API, MYSPACE API, FACEBOOK API, FLICKR API, Google SOAP Search API and the like). The web API comprises implementations of one or more functions that search the web pages 134 associated with the web site for the sensitive data in accordance with the second search query. The data polling component 128 examines search results for the second search query returned by the one or more functions to determine whether any sensitive data is presented or disclosed on the web pages 134. The search results may be in a search response format of the query language used at the web site. As such, the web access engine 130 converts the search results into a format that is recognizable and/or searchable by the data polling component. As described above, if the data polling component 128 identifies any sensitive data within the search results, the parents are notified and/or the sensitive data is automatically removed.

According to yet another embodiment of the present invention, the web access engine 130 uses a web page processing technique (e.g., Document Object Model (DOM) or tree-based parser, Virtual Token Descriptor for eXtensible Markup Language (VTD-XML), Simple API parser for XML (SAX) and the like) to parse content of the web pages 134 in order to identify any sensitive data leaked through the web pages 134. The web access engine 130 may also comprise a web or screen scraping technology that employs the web page processing technique to extract information from the parsed web pages 134 and transform the information into a format recognizable and/or searchable by the data polling component 128 (e.g., in a generic language). As described above, if the data polling component 128 determines a disclosure of any sensitive data from the transformed information, the sensitive data is automatically removed from the web pages 134 and/or the parents are notified.

In one embodiment, a plug-in included with the plug-in information 132 indicates a format or layout of the web pages 134 as viewed on a browser application at the client 104. In one embodiment, a plug-in comprising an underlying object structure (e.g., Document Object Model) for representing the web pages 134 organized in various formats (e.g., Markup Language (e.g., HTML or XML)/JavaScript based content as well as content in a related format) enables the web access engine 130 to parse the web pages 134 in order to identify any sensitive data. In one embodiment, a plug-in describes a logical or semantic structure (e.g., XML schemas, Document Type Definition and the like) of the web pages 134, which is used by the web access engine 130 to parse the rendered content to identify a disclosure of any sensitive data associated with a particular user.

Figure 2:
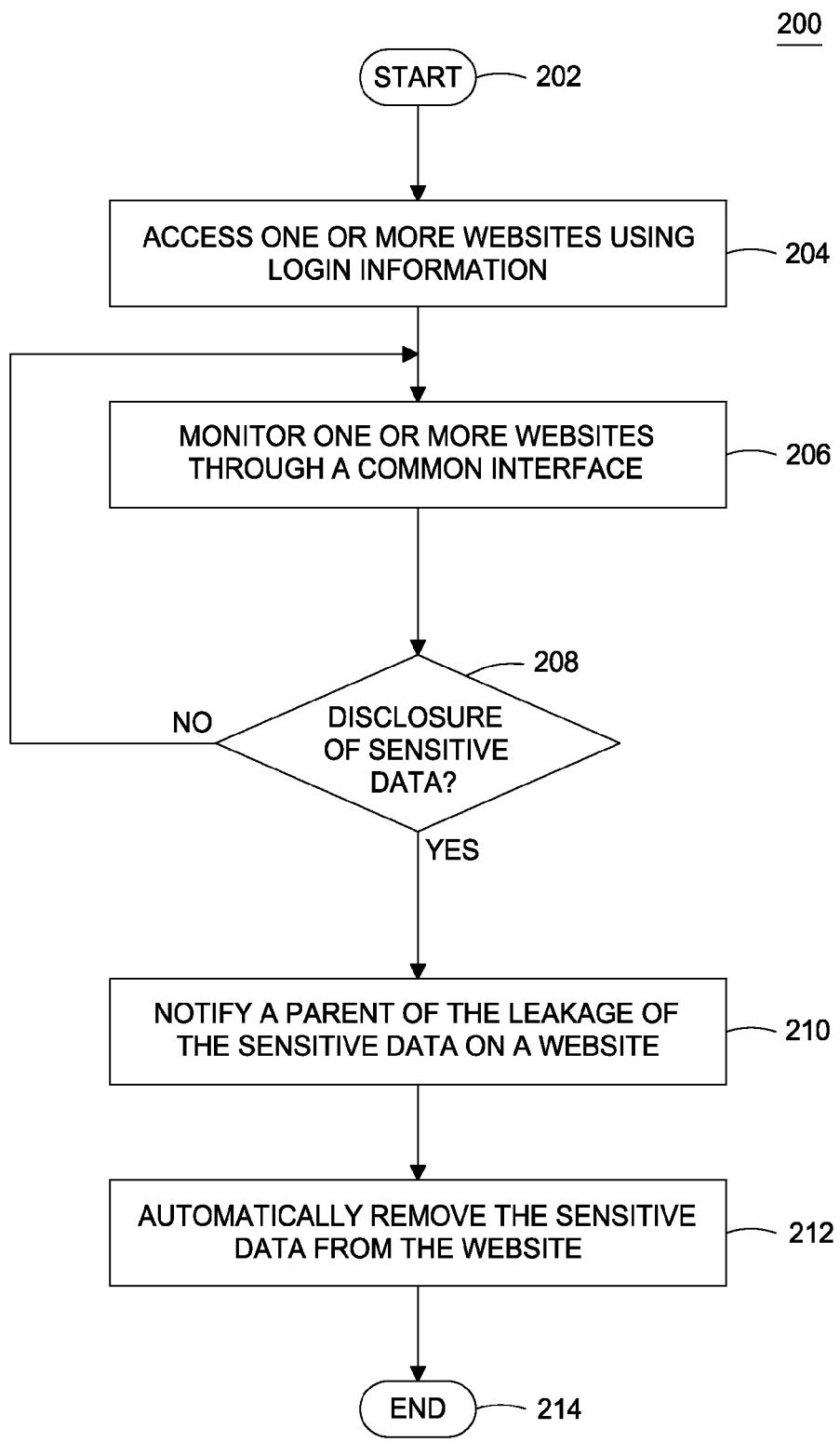
FIG. 2 depicts a flow diagram of a method for protecting sensitive data according to one or more embodiments of the present invention.

FIG. 2 depicts a flow diagram of a method 200 for protecting sensitive data from being leaked onto a computer network according to one or more embodiments of the present invention. The method 200 begins at step 202 and proceeds to step 204.

At step 204, one or more web sites are accessed using login information (e.g., a login name, a challenge question answer, a password, a profile name, an email address, a real name and the like) associated with a user of the one or more web sites. At step 206, the one or more websites are monitored for sensitive data related to the user through a common interface. As described above, the common interface enables a search for the sensitive data on one or more web pages (e.g., the web pages 134 of FIG. 1) within the one or more web sites. In one embodiment, the one or more web sites are polled on a periodic basis to determine whether the sensitive data has been disclosed. According to another embodiment of the present invention, the step 206 has been further described in FIG. 3 by a sequence of steps for a method 300.

At step 208, a determination is made as to whether a disclosure of the sensitive data on the one or more web pages has occurred. If disclosure of the sensitive data has not occurred (option "NO"), the method 200 returns to step 206. If the disclosure of the sensitive data has occurred (option "YES"), the method 200 proceeds to step 210. At step 210, a notification is sent to the parents of the user as to the disclosure of a portion of the sensitive data through a web site. At step 212, the portion of the sensitive data is automatically removed from the web site. At step 214, the method 200 ends.

Figure 3:
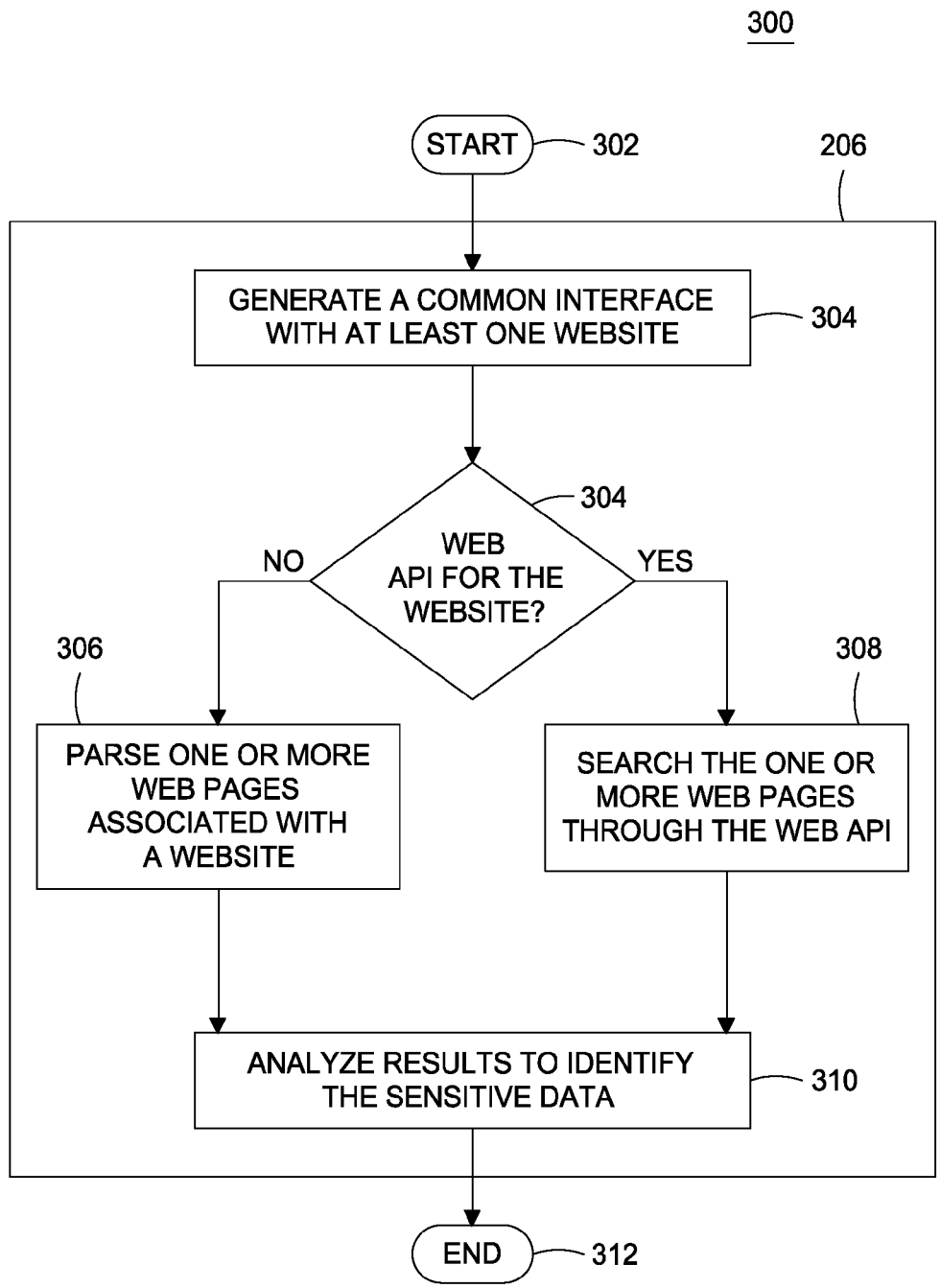
FIG. 3 depicts a flow diagram of a method for monitoring one or more web sites for sensitive data according to one or more embodiments of the present invention.

FIG. 3 depicts a flow diagram of a method 300 for monitoring one or more web sites for sensitive data related to the user according to one or more embodiments of the present invention. The method 300 begins at step 302 and proceeds to step 304.

At step 304, a common interface is generated between the data polling component (e.g., the data polling component 128 of FIG. 1) and one or more web sites. As explained above, the web access engine 130 functions as the common interface by mapping a search query written in a generic query language associated with the data polling component to a second search query written in a query language that is used at the web site.

At step 306, a determination is made as to whether a web API is available for the web site. If the web API is available for the web site (option "YES"), the method 300 proceeds to step 308.

At step 308, the one or more web pages (e.g., the web pages 134 of FIG. 1) are searched for a disclosure of the sensitive data through function calls implemented in the web API. The second search query is submitted to the web API and a response comprising search results is subsequently returned. As mentioned above, plug-ins comprise web site specific information that is necessary to access the web API to search one or more web pages. At step 310, the search results are analyzed to identify the sensitive data on one or more web pages.

At step 304, however, if the web API is not available for the web site (option "NO"), the method 300 proceeds to step 306. At step 306, one or more web pages associated with the web site are parsed. In one embodiment, a web or screen scraping program parses the one or web pages using based on an underlying object structure (DOM). Then, the web or screen scraping program extracts information from the one or more parsed web pages and transforms the extracted information into a second format (e.g., a format examinable by the data polling component 128 of FIG. 1). At step 310, the results of the transformation are analyzed to identify the sensitive data. At step 312, the method 300 ends.

Figure 4:
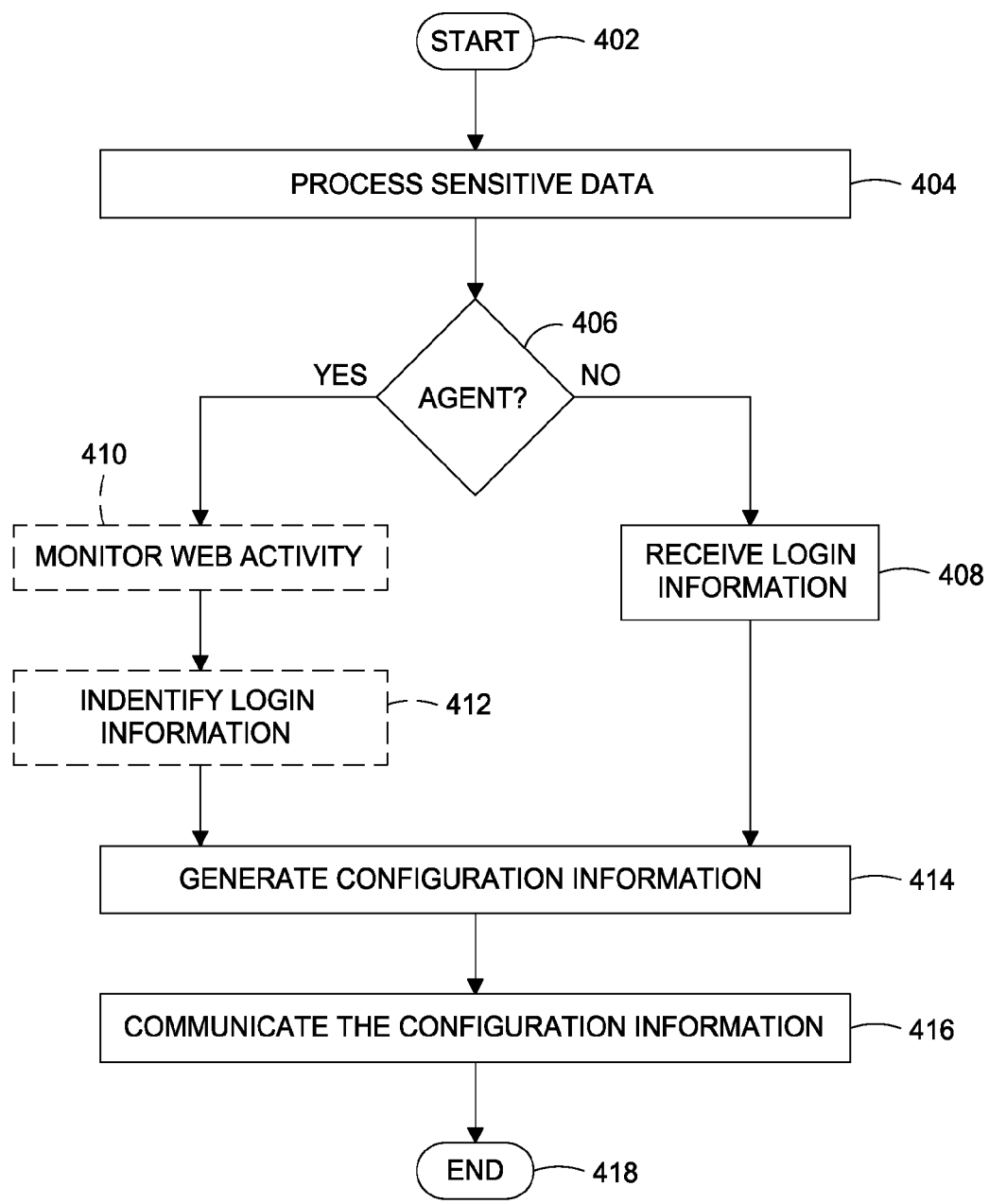
FIG. 4 depicts a flow diagram of a method for generating configuration information to be used to protect sensitive data, according to one or more embodiments of the present invention.

FIG. 4 depicts a flow diagram of a method 400 for generating configuration information to be used to protect sensitive data according to one or more embodiments of the present invention. The method 400 begins at step 402 and proceeds to step 404.

At step 404, sensitive data is processed. As explained above, a data polling component 128 (e.g., the data leakage protection component 120 of FIG. 1) processes the sensitive data (e.g., from the parents). At step 406, a determination is made as to whether an agent (e.g., the agent 118 of FIG. 1) is operable on a client computer (e.g., the client 102 of FIG. 1).

If the agent is installed on the client computer (option "YES"), the method 400 proceeds to step 410. At step 410, web activity at the client computer is monitored. In one embodiment, the agent monitors interactions between a user and one or more web sites. At step 412, login information (e.g., profile name, password and the like) associated with the user is identified from various resources within the client computer. In one embodiment, the agent examines a web history to determine which web sites (e.g., social networking sites and the like) are visited by the user. The agent collects information regarding one or more profiles associated with the one or web sites.

At step 406, however, if the agent is not installed (option "NO"), the method 400 proceeds to step 408. At step 408, login information is received by a data protection leakage component (e.g., the data leakage protection component 120). In one embodiment, the parents of the user input the login information into the data leakage protection component to configure the data polling component. Then, the method 400 proceeds to step 414.

At step 414, configuration information is generated. In one embodiment, the configuration information comprises URLs for the one or more web sites, the sensitive data and/or the login information associated with the one or more web sites. At step 416, the configuration information is communicated. In one embodiment, the configuration information is stored in a configuration information database (e.g., the configuration information database 104 of FIG. 1). The method 400 ends at step 418.

While the foregoing is directed to embodiments of the present invention, other and further embodiments of the invention may be devised without departing from the basic scope thereof, and the scope thereof is determined by the claims that follow.

What is claimed is:

1. A method of protecting sensitive data associated with a first user from being leaked to a computer network, comprising:
identifying login information used by a second user to access one or more websites;
monitoring, using at least one computer processor, data related to the second user that is presented on at least one web page associated with one of the one or more websites through a common interface using the login information, wherein the common interface enables a search for sensitive data associated with the first user on the at least one web page associated with the one of the one or more websites, wherein monitoring the data related to the second user comprises parsing the at least one web page and generating a search query to be communicated to the one of the one or more websites through the common interface; and
determining a disclosure of the sensitive data associated with the first user on the at least one web page associated with the one of the one or more websites.

2. The method of claim 1 further comprising notifying the first user regarding the disclosure of the sensitive data.

3. The method of claim 1 further comprising removing the disclosed sensitive data from the web page.

4. The method of claim 1, wherein the login information comprises at least one of a login name, a password, a profile name, an email address or a real name.

5. The method of claim 1, wherein monitoring the data related to the second user further comprising:
examining the parsed at least one web page to identify the sensitive data.

6. The method of claim 1, wherein monitoring the data related to the second user further comprising:
processing a response to the search query from the one of the one or more websites.

7. The method of claim 1, wherein monitoring the one of the one or more websites further comprising:
translating a first search query in a first query language into a second search query in a second query language, wherein the second query language is used at the one of the one or more websites;
communicating the second search query to the one of the one or more websites; and
examining a response to the second search query from the one of the one or more websites.

8. The method of claim 1, wherein monitoring the data related to the second user further comprises using a plug-in associated with a web site to search a web page associated with the web site for the sensitive data, wherein the plug-in indicates a format associated with at least one of the web page or a web API used at the web site.

9. An apparatus for protecting sensitive data associated with a first user from being leaked to a computer network, comprising:
a web access engine operating on at least one processor to generate a common interface for examining at least one web site for sensitive data associated with the first user using login information used by a second user to access the at least one web site; and
a data polling component for using the common interface to identify the sensitive data associated with the first user presented on a web page of the at least one web site, wherein identifying the data associated with the first user comprises parsing the at least one web page and generating a search query to be communicated to the web page of the at least one web site through the common interface.

10. The apparatus of claim 9 further comprising an agent for monitoring web activity associated with the at least one web site to identify login information used at the at least one web site to generate configuration information.

11. The apparatus of claim 9 further comprising a first plug-in for indicating a query language used at a web site of the at least one web site.

12. The apparatus of claim 9 further comprising a second plug-in for indicating a format associated with at least one of the web page or a web API used at a web site of the at least one web site.

13. The apparatus of claim 9 further comprising a data leakage protection component for receiving the sensitive data, the at least one web site and login information to produce configuration information.

14. A system for protecting sensitive data associated with a first user from being leaked to a computer network, comprising:
   a client computer, comprising a data leakage protection component for processing sensitive data associated with the first user, at least one web site and login information used by a second user to access the at least one web site to produce configuration information; and
   a server, comprising:
      a web access engine for generating a common interface, wherein the common interface enables a search for the sensitive data associated with the first user on at least one web page of the at least one web site,
      a data polling component for accessing at least one web site using the login information associated with the second user of the at least one web site, monitoring data related to the second user that is presented on the at least one web page through the common interface, and determining a disclosure of the sensitive data associated with the first user on the at least one web page of the at least one web site, wherein monitoring the data associated with the second user comprises parsing the at least one web page and generating a search query to be communicated to the at least one web page through the common interface.

15. The system of claim 14 further comprising an agent for collecting the configuration information from a web history.

16. The system of claim 14 further comprising plug-in information regarding a plurality of plug-ins for searching the at least one web page.

17. The system of claim 16, wherein at least one plug-in provides information regarding the at least one web page to parse the at least one web page.

18. The system of claim 17, wherein at least one plug-in accesses at least one Application Programming Interface associated with the at least one web site to search the at least one web page.

\* \* \* \* \*